United States Patent
Bach et al.

(10) Patent No.: US 12,228,179 B2
(45) Date of Patent: Feb. 18, 2025

(54) DRUM BRAKE

(71) Applicant: Continental Teves AG & Co. OHG, Frankfurt am Main (DE)

(72) Inventors: Uwe Bach, Niedernhausen (DE); Christian Vey, Frankfurt am Main (DE); Ahmed Sefo, Frankfurt am Main (DE); Jens Hoffmann, Darmstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 181 days.

(21) Appl. No.: 17/415,226

(22) PCT Filed: Dec. 17, 2019

(86) PCT No.: PCT/EP2019/085535
§ 371 (c)(1),
(2) Date: Jun. 17, 2021

(87) PCT Pub. No.: WO2020/127189
PCT Pub. Date: Jun. 25, 2020

(65) Prior Publication Data
US 2022/0065310 A1 Mar. 3, 2022

(30) Foreign Application Priority Data
Dec. 18, 2018 (DE) ............... 10 2018 222 125.1

(51) Int. Cl.
F16D 51/20 (2006.01)
F16D 66/00 (2006.01)
B60T 8/171 (2006.01)

(52) U.S. Cl.
CPC ............ *F16D 51/20* (2013.01); *F16D 66/00* (2013.01); *B60T 8/171* (2013.01); *F16D 2066/005* (2013.01)

(58) Field of Classification Search
CPC ...................................... F16D 51/20
See application file for complete search history.

(56) References Cited

U.S. PATENT DOCUMENTS

| 4,615,419 A | 10/1986 | Gaiser |
| 4,850,459 A | 7/1989 | Johannesen et al. |

(Continued)

FOREIGN PATENT DOCUMENTS

| CN | 1918397 A | 2/2007 |
| CN | 201093022 Y | 7/2008 |

(Continued)

OTHER PUBLICATIONS

Office Action dated Dec. 16, 2019 from correspondiong German Application No. DE 10 2018 222 125.1.

(Continued)

*Primary Examiner* — Melody M Burch

(57) ABSTRACT

For controlling electromechanically actuatable brakes of servo type construction, it is necessary to detect the forces acting on the abutment of the brake shoes. The abutment is therefore formed from a massive material which deforms under load, wherein measurement devices are provided which detect this deformation. The shape of the abutment is selected in such a way that the abutment has measurement gaps, the size of which changes when the abutment is loaded. The size of the measurement gaps can be sensed by means of Hall sensors or AMR sensors, for example.

15 Claims, 2 Drawing Sheets

(56) References Cited

U.S. PATENT DOCUMENTS

| | | |
|---|---|---|
| 4,995,480 A | 2/1991 | Hazelden et al. |
| 6,176,352 B1 | 1/2001 | Maron et al. |
| 2008/0071457 A1 | 3/2008 | Shiraki |
| 2009/0260929 A1 | 10/2009 | Boyle et al. |
| 2010/0206677 A1 | 8/2010 | Shiraki |
| 2013/0186717 A1 | 7/2013 | Muramatsu et al. |
| 2020/0191218 A1 | 6/2020 | von Hayn et al. |

FOREIGN PATENT DOCUMENTS

| | | | |
|---|---|---|---|
| CN | 101861260 A | 10/2010 | |
| CN | 203836029 U | 9/2014 | |
| CN | 104265803 A | 1/2015 | |
| CN | 205226166 U | 5/2016 | |
| DE | 68901719 T2 | 1/1993 | |
| DE | 69001840 T2 | 10/1993 | |
| DE | 19640995 A1 | 4/1998 | |
| DE | 102007043634 A1 | 3/2008 | |
| DE | 102007054498 A1 | 5/2008 | |
| DE | 112006002895 T5 | 9/2008 | |
| DE | 112011103541 T5 | 8/2013 | |
| DE | 102013224922 A1 | 6/2015 | |
| DE | 102014217405 A1 * | 3/2016 | ............ B60T 13/741 |
| DE | 102016221189 B4 | 5/2017 | |
| DE | 102017217410 A1 | 4/2019 | |
| EP | 0388040 A2 | 9/1990 | |
| EP | 0485093 A1 | 5/1992 | |
| EP | 0594233 B1 | 4/1994 | |
| EP | 0988468 A1 | 3/2000 | |
| EP | 2518360 A1 | 10/2012 | |
| GB | 2172675 A * | 9/1986 | .............. B60T 7/206 |
| JP | H02266133 A | 10/1990 | |
| JP | H11201197 A | 7/1999 | |
| JP | 2002067914 A | 3/2002 | |
| JP | 2010276047 A | 12/2010 | |
| KR | 20040082057 A | 9/2004 | |
| KR | 100682526 B1 | 2/2007 | |
| WO | 9953214 A1 | 10/1999 | |
| WO | 2009/044908 A2 | 4/2009 | |

OTHER PUBLICATIONS

International Search Report and Written Opinion dated Mar. 11, 2020 from corresponding International Patent Application No. PCT/EP2019/085535.

Dr. Rainer Wieler, "Specialized internship BM6/7 vehicle brakes", Augsburg University of Applied Sciences—Faculty of Mechanical Engineering—Jun. 12, 2015, V 2.1, machine translated from German into English, https://translate.googleusercontent.com/translate_f [Aug. 19, 2021 3:35:17 PM].

International Search Report and Written Opinion dated Feb. 1, 2019 from corresponding International Patent Application No. PCT/EP2018/074368.

Prof. Dr. Rainer Wieler "Focal internship BM6/7 Vehicle brakes", Augsburg University of Applied Sciences V2.1, Jun. 12, 2015.

Chinese Office Action dated Jun. 22, 2022 for the counterpart Chinese Patent Application No. 201980084261.7.

Korean Office Action dated Oct. 25, 2022 for the counterpart Korean Patent Application No. 10-2021-7016259.

Japan Patent Office, Notice of Reasons for Refusal drafted on Apr. 28, 2022, for Japanese Patent Application No. 2021-531419.

Chinese Office Action dated Dec. 22, 2022 for the counterpart Chinese Application No. 201980084261.7.

Chinese Notice of Allowance dated May 2, 2023 or the counterpart Chinese Application No. 201980084261.7.

Notice of Preliminary Rejection issued on Oct. 26, 2023 for the Korean Patent Application No. 10-2021-7016259 and translation of same.

Office action dated Dec. 22, 2023; of the counterpart Japanese application 2021-531419.

* cited by examiner

DRUM BRAKE

CROSS-REFERENCE TO RELATED APPLICATIONS

This U.S. patent application claims the benefit of PCT patent application No. PCT/EP2019/085535, filed Dec. 17, 2019, which claims the benefit of German patent application No. 10 2018 222 125.1, filed Dec. 18, 2018, both of which are hereby incorporated by reference.

BACKGROUND

The invention relates to a drum brake of servo type construction having a brake drum and two brake shoes, which can be applied to the brake drum, are arranged on the brake shoe side of a carrier plate and each have a pressure end and a supporting end, wherein there is between the pressure ends a spreader device, which is mounted so as to float relative to the carrier plate and is supported in force introduction points at the pressure ends in order to introduce force into the two pressure ends, and wherein there is between the supporting ends a ram, which is mounted so as to float relative to the carrier plate and is supported on the two supporting ends in order to transmit force.

An electrically actuatable drum brake of this type, in which the spreader device consists of an electric actuator, is described in WO 99/53214 A1.

In order to be able to control or regulate the actuator on brake application, information on the amount of force acting in the drum brake is required. According to WO 99/53214 A1, a load sensor is arranged on an end face of the abutment and measures the force with which one of the brake shoes rests on the abutment.

This information is not, however, sufficiently precise for controlling or regulating the electric actuator since, on brake application, the frictional forces acting on the brake shoes may differ, so that the support forces influenced by the frictional forces may also differ for each brake shoe. This support force of a brake shoe therefore does not reflect the total amount of forces and braking torques acting in the drum brake.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The invention is therefore based on the object of creating a drum brake with a load measuring device at the abutment which reflects the total amount of forces acting in the drum brake on brake application.

Each brake shoe has, at the pressure end thereof, a pressure head adjacent to the force introduction point there, wherein both pressure heads can be supported on an abutment arranged between them and connected to the carrier plate, and the abutment that can be deformed elastically under load, and one or more sensors are provided, which detect the deformation of the abutment that arises under load to enable the braking torque produced in the drum brake to be determined by means of the sensor signal.

This configuration of the abutment makes it possible to determine the braking forces in a drum brake of servo type construction.

In order to determine the deformation of the abutment, use can be made of strain gauges, which are mounted on the abutment.

In order to achieve deformation, the abutment is preferably formed by a base, which is connected via a web to a pedestal firmly connected to the carrier plate, wherein the pressure heads rest against the opposite edges of the base. When the base is subjected to a load, the base shifts or tilts relative to the pedestal, and this can be detected by measurement.

In a first simple embodiment, the base is connected to the pedestal via a central web, wherein the mutually facing edges of the base and the pedestal extend parallel to one another and enclose a measurement gap between them. The size of the measurement gap changes when the base is moved relative to the pedestal. The change in the size of the measurement gap can be detected by measurement.

Another embodiment envisages that the abutment has a U-shape with a base and two arms, which project from the base and on the outside of which the abutment ends of the brake shoes are supported, wherein the sensor or sensors are of the type which can detect the slope of the arms, which changes under load.

For this purpose, the base is carried by a central web starting from a pedestal secured on the carrier plate and adjoining the inner edge of the base, with the result that the arms are oriented toward the carrier plate.

In order to form a measurement gap in this embodiment too, the pins projecting laterally from the central web reach as far as the inner edges of the arms, forming a measurement gap.

Another embodiment of the abutment envisages that the base and the pedestal are connected to one another via two struts situated at the edges to form a frame, wherein at least one pin starting from the pedestal extends to the inner edge of the base to form a measurement gap.

In the case of unilateral loading, the rectangular frame is bent into a parallelogram, with the result that the measurement gaps are proportionately reduced.

To increase measurement accuracy, the pedestal, the webs and the base are preferably designed as an integral component.

As already explained above, measurement of the deformation of the abutment can be performed with the aid of strain gauges.

Determination of the measurement gap size can be performed, for example, by means of Hall sensors or AMR sensors based on the anisotropic magnetoresistive effect, for which purpose the arms are provided with magnets which function as signal emitters for the Hall sensor or AMR sensor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The invention will be explained in more detail below on the basis of three exemplary embodiments. The drawings show.

DETAILED DESCRIPTION

Figure 1:
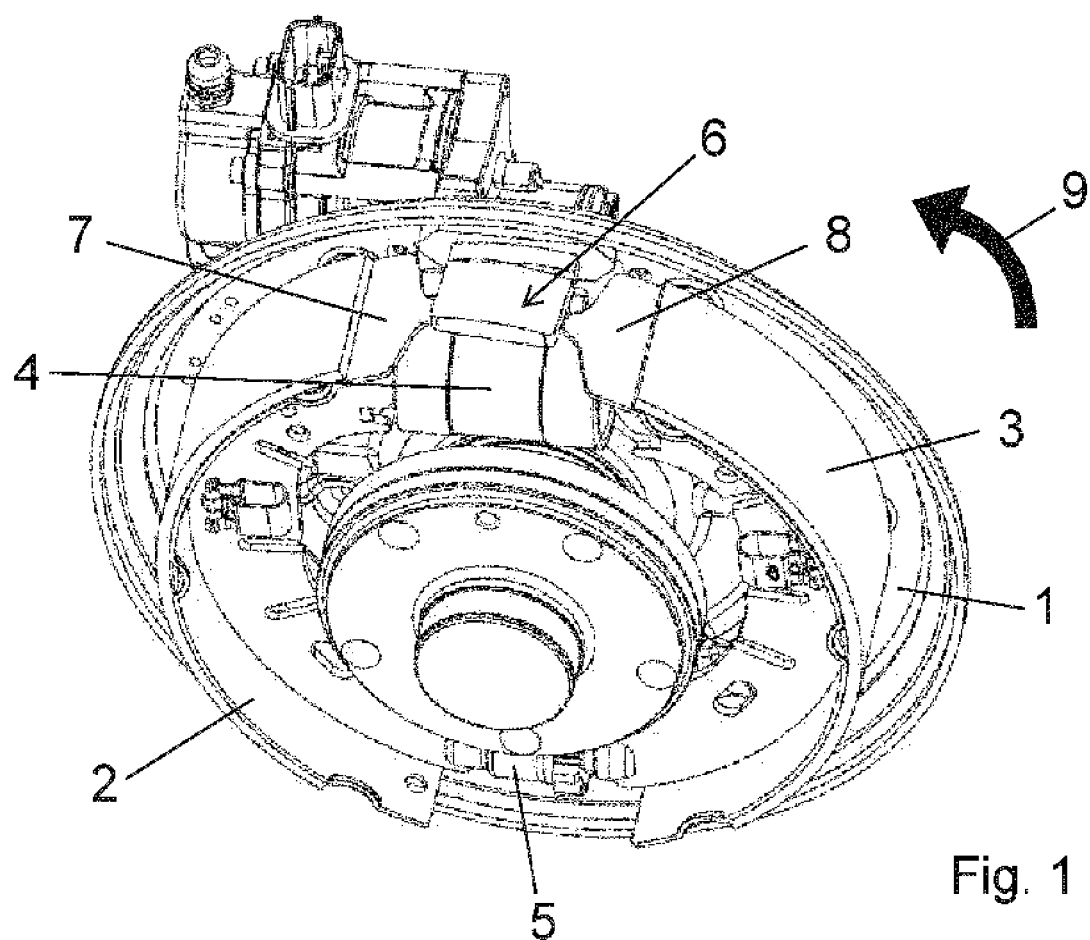
FIG. 1 a brake drum with a first embodiment of the abutment.

FIG. 1 shows a drum brake of a motor vehicle in perspective view, said drum brake comprising a circular carrier plate 1 and two brake shoes 2 and 3, which are arranged concentrically with the central axis of the carrier plate 1.

The brake shoes 2, 3 are surrounded concentrically by a brake drum (not illustrated here), which is connected to a motor vehicle wheel to be braked, with the result that—when the brake shoes 2, 3 are pressed against this brake drum—the rotating wheel is decelerated (service braking), or a stationary wheel is prevented from rotating (parking braking).

The brake shoes 2, 3 each have a pressure end and a supporting end, wherein a spreader device 4 is arranged between the opposite pressure ends. This is generally a hydraulically, electromechanically or electrohydraulically actuatable device.

Between the likewise oppositely situated supporting ends there is a ram 5, which transmits forces from one to the other brake shoe.

Both the spreader device 4 and the ram 5 are mounted so as to float in the circumferential direction relative to the carrier plate 1, and therefore this is a "duo servo" brake, which has a strong self-energizing effect.

In order to support the braking forces, which act as frictional forces between the brake shoes 2, 3 and the brake drum, an abutment 6 is provided. This is situated radially outside the spreader device 4, wherein, adjacent to the force introduction points of the spreader device 4, there are furthermore at the ends of the brake shoes 2, 3 pressure heads 7, 8, which are supported on both sides of the abutment 6. Since both the spreader device 4 and the ram 5 are mounted so as to float, the braking force is in each case transmitted only from the trailing brake shoe to the abutment 6.

Considering the case where the brake drum is rotating counterclockwise in accordance with the illustrated arrow 9, the brake shoe 2 illustrated on the left is the leading brake shoe, and the brake shoe 3 illustrated on the right is the trailing shoe.

The spreader device 4 pushes the two brake shoes 2, 3 apart, wherein the leading brake shoe 2 is taken along by the brake drum in the direction of rotation thereof relative to the carrier plate 1. The frictional force exerted thereon is transmitted by means of the ram 5 to the trailing brake shoe 3 as well, with the result that the pressure head 8 thereof is supported on the abutment 6.

The supporting force is measured there, which force is a measure of the braking force and can thus be used to control the spreader device 4.

Figure 2:
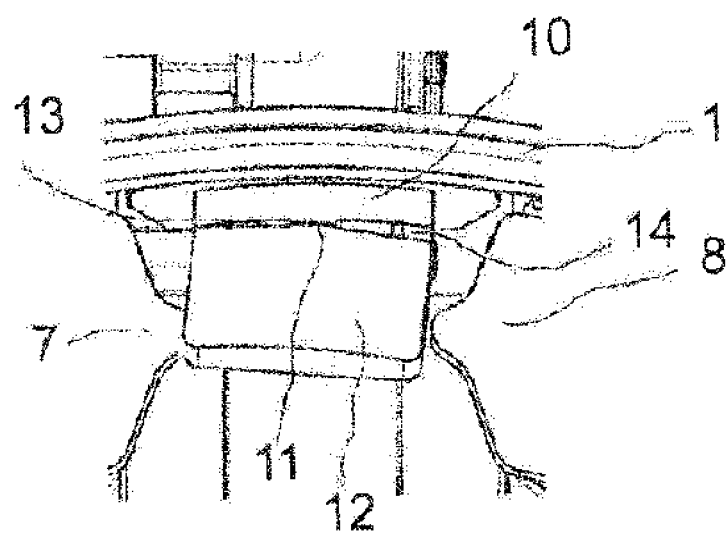
FIG. 2 an enlarged depiction of the abutment of the drum brake shown in FIG. 1.

For this purpose, in the simplest case, the abutment 6 shown in FIG. 2 consists of a massive but flat component which projects perpendicularly from the carrier plate 1 and is secured thereon, thus enabling the pressure heads 7, 8 to rest on the edges thereof facing in the circumferential direction.

Here, the abutment 6 comprises a pedestal 10, connected to which via a narrow central web 11 is a base 12, against the edges of which that face in the circumferential direction the pressure heads 7, 8 of the brake shoes 2, 3 can be placed. Since the mutually facing edges of the pedestal 10 and the base 12 extend parallel to one another with a small clearance, two measurement gaps 13, 14 are formed between the pedestal 10 and the base 12, starting from the web 11.

When the brake drum is rotated counterclockwise in accordance with the illustrated arrow 9, the brake shoe 2 illustrated on the left is a leading brake shoe, and that illustrated on the right is a trailing brake shoe 3. Owing to the frictional forces between the brake shoes and the brake drum, the brake shoes, because they are mounted so as to float, are taken along in the direction of rotation, with the result that the trailing brake shoe 3 is supported on the base 12 of the abutment 6, and the base tilts relative to the pedestal 10, as a result of which—as shown in FIG. 2—the measurement gap 14 facing it widens and the measurement gap 13 facing away from it becomes narrower.

These changes can be detected by suitable sensors and represent a value for the braking force introduced, which, in turn, can be used to control the spreader device.

In the case of a different direction of rotation, the functions of the two brake shoes 2, 3 are interchanged, that on the left becoming the trailing shoe and that on the right becoming the leading shoe, with the result that the latter is supported on the base 12 of the abutment 6, as a result of which the left-hand measurement gap 13 facing it is widened and the right-hand measurement gap 14 facing away from it is narrowed.

Figure 3:
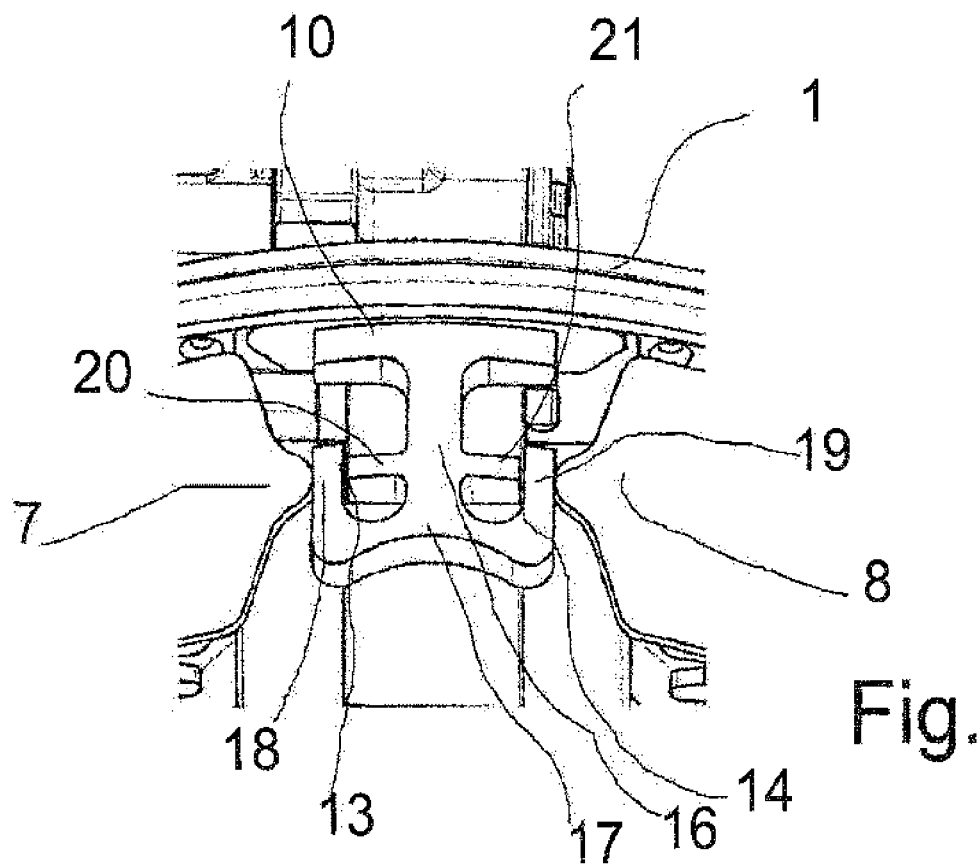
FIG. 3 an enlarged depiction of a second embodiment of the abutment.

Another possibility for the design of the abutment is illustrated in FIG. 3. Extending out of the pedestal 10 secured on the carrier plate 1 is a central web 16, which merges into a transverse web 17, from each of the ends of which a respective arm 18, 19 pointing toward the pedestal 10 emerges. The central web 16, the transverse web 17 and the two arms 18, 19 thus form a T. The pressure heads 7, 8 of the brake shoes 2, 3 are placed against the outer edge of the arms 18, 19, which faces in the circumferential direction.

Projecting laterally from the central web 16 are two pins 20, 21, which end shortly before the inner edges of the arms 18, 19, in each case forming a measurement gap 13, 14.

The respective leading brake shoe 2, 3 bends the arm 19 or 18 on which it is supported inward, as a result of which the associated measurement gap 14 or 13 is reduced in size, which, in turn, can be detected by measurement.

At the same time, the pins 20, 21 serve as overload protectors. If the braking forces become too great, the arms 17, 18 are supported on the associated pin 20, 21.

Figure 4:
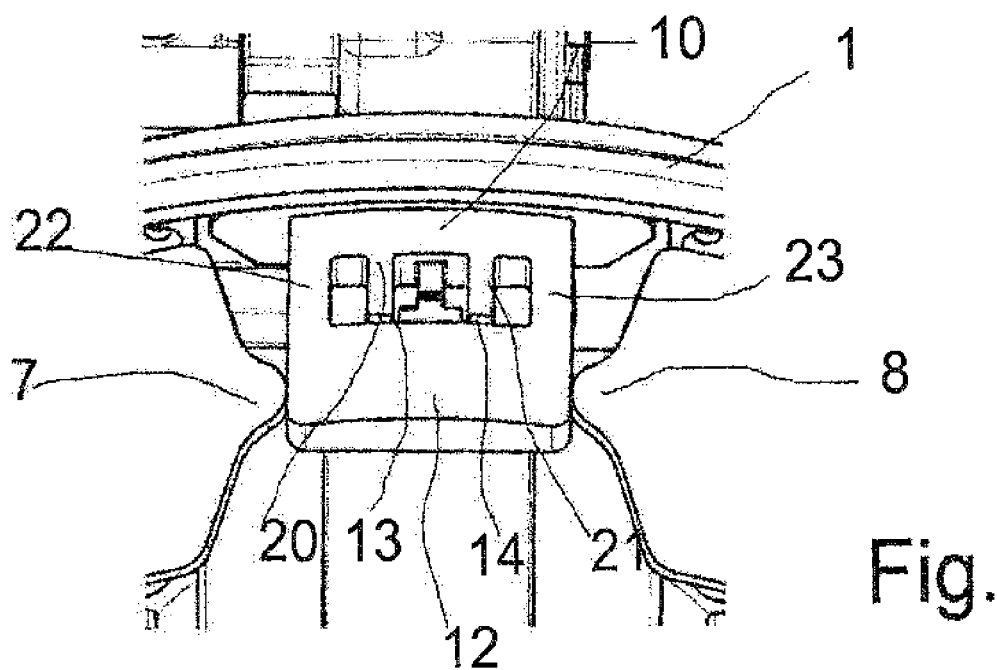
FIG. 4 an enlarged depiction of a third embodiment of the abutment.

A third embodiment, shown in FIG. 4, comprises a pedestal 10 and a base 12 which are connected to one another via two struts 22, 23 situated at the edges, thus forming a frame with a central opening. Emanating from the inner edge of the pedestal 10, which delimits the opening, are two pins 20, 21, which reach as far as the inner edge of the base 12, apart from a measurement gap 13, 14.

When the base 12 is subjected to a load in the circumferential direction, it shifts parallel to the pedestal 10, with the result that the rectangular frame is transformed into a parallelogram, wherein the base 12 approaches the pedestal 10 and the ends of the pins 20, 21, as a result of which the measurement gaps 13, 14 are correspondingly reduced in size.

In all the embodiments, there are various possibilities available for measuring the change in the measurement gap. Sensors which utilize the anisotropic magnetoresistive effect (AMR effect) or, alternatively, linear Hall sensors can be used.

Independently of the measurement of the measurement gap size, the respective change in shape of the abutment can be detected by means of strain gauges.

The sensors allow determination of the braking torque acting in the drum brake. This is used for controlling the braking effect of the drum brake.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A drum brake of servo construction comprising:
   a brake drum;
   two brake shoes, which can be applied to the brake drum, each having a pressure end and a supporting end;
   a spreader device between the pressure ends of the brake shoes, which is mounted to float relative to a carrier plate and is supported in force introduction points at the pressure ends to introduce force into the pressure ends;
   a ram located between the supporting ends, which is mounted to float relative to the carrier plate and is supported on the supporting ends in order to transmit force;
   a pressure head at the pressure end on each brake shoe adjacent to the force introduction point, wherein the pressure heads can be supported on an abutment arranged therebetween and connected to the carrier plate, wherein the abutment is deformed elastically under load;
   at least one sensor which detects deformation of the abutment that arises under load to enable the braking torque produced in the drum brake to be determined with a sensor signal;
   wherein the abutment is formed by a base, which ends via a central web at a pedestal connected to the carrier plate, wherein the pressure heads rest against opposite edges of the base, wherein the base is carried by the central web starting from the pedestal secured on the carrier plate and adjoining the inner edge of the base, wherein arms are oriented toward the carrier plate; and
   a plurality of pins projecting laterally from the central web reach the inner edges of the arms, forming a measurement gap.

2. The drum brake as claimed in claim 1, wherein the base is connected to the pedestal via the central web, wherein the mutually facing edges of the base and the pedestal extend parallel to one another and enclose the measurement gap between them.

3. The drum brake as claimed in claim 1, wherein the abutment has a U-shape with a base and the arms, which projects from the base, wherein the pressure heads are supported on the outer edges thereof, and the at least one sensor can detect the slope of the arms, which changes under load.

4. The drum brake as claimed in claim 1, wherein the pedestal, the central web, and the base form an integral component.

5. The drum brake as claimed in claim 1, wherein at least one strain gauge of the at least one sensor is attached to the abutment to detect the deformation thereof.

6. The drum brake as claimed in claim 1, wherein the at least one sensor is based on one of: the anisotropic magnetoresistive effect or the Hall effect.

7. The drum brake as claimed in claim 1, wherein the abutment is situated radially outside the spreader device, and the pressure heads are adjacent to the force introduction points of the spreader device.

8. The drum brake as claimed in claim 1, wherein the ram is located on a lower half of the brake drum, and the abutment is arranged on an upper half of the brake drum.

9. The drum brake as claimed in claim 8, wherein the ram is located diametrically opposite to the abutment.

10. A drum brake of servo construction comprising:
    a brake drum;
    two brake shoes, which can be applied to the brake drum, each having a pressure end and a supporting end;
    a spreader device between the pressure ends of the brake shoes, which is mounted to float relative to a carrier plate and is supported in force introduction points at the pressure ends to introduce force into the pressure ends;
    a ram located between the supporting ends, which is mounted to float relative to the carrier plate and is supported on the supporting ends in order to transmit force;
    a pressure head at the pressure end on each brake shoe adjacent to the force introduction point, wherein the pressure heads can be supported on an abutment arranged therebetween and connected to the carrier plate, wherein the abutment is deformed elastically under load;
    at least one sensor which detects deformation of the abutment that arises under load to enable the braking torque produced in the drum brake to be determined with a sensor signal; and
       wherein a base is carried by a central web starting from a pedestal secured on the carrier plate and adjoining the inner edge of the base;
       wherein the base and the pedestal are connected to one another via two struts situated at edges of the base and the pedestal to form a frame; and
       at least one pin starting from the pedestal extends to an inner edge of the base to form a measurement gap.

11. The drum brake as claimed in claim 10, wherein the pedestal, the central web, and the base form an integral component.

12. The drum brake as claimed in claim 10, wherein at least one strain gauge of the at least one sensor is attached to the abutment to detect the deformation thereof.

13. The drum brake as claimed in claim 10, wherein the at least one sensor is based on one of: the anisotropic magnetoresistive effect or the Hall effect.

14. The drum brake as claimed in claim 10, wherein the abutment is situated radially outside the spreader device, and the pressure heads are adjacent to the force introduction points of the spreader device.

15. A drum brake of servo construction comprising:
    a brake drum;
    two brake shoes, which can be applied to the brake drum, each having a pressure end and a supporting end;
    a spreader device between the pressure ends of the brake shoes, which is mounted to float relative to a carrier plate and is supported in force introduction points at the pressure ends to introduce force into the pressure ends;

a ram located between the supporting ends, which is mounted to float relative to the carrier plate and is supported on the supporting ends in order to transmit force;

a pressure head at the pressure end on each brake shoe adjacent to the force introduction point, wherein the pressure heads can be supported on an abutment arranged therebetween and connected to the carrier plate, wherein the abutment is deformed elastically under load;

at least one sensor which detects deformation of the abutment that arises under load to enable the braking torque produced in the drum brake to be determined with a sensor signal; and wherein the abutment is formed by a base wherein mutually facing edges of the base and a pedestal extend parallel to one another; and wherein the base and the pedestal are connected to one another via two struts situated at edges of the base and the pedestal to form a frame, wherein at least one pin starting from the pedestal extends to an inner edge of the base to form a measurement gap.

* * * * *